No. 794,247. PATENTED JULY 11, 1905.
D. D. PALMER.
JOINT.
APPLICATION FILED JAN. 18, 1905.

Witnesses:
Fred S. Greenleaf.
A. W. Knapp.

Inventor.
Dolphas D. Palmer,
by Crosby & Gregory
attys.

No. 794,247.

Patented July 11, 1905.

UNITED STATES PATENT OFFICE.

DOLPHAS D. PALMER, OF WALTHAM, MASSACHUSETTS.

JOINT.

SPECIFICATION forming part of Letters Patent No. 794,247, dated July 11, 1905.

Application filed January 18, 1905. Serial No. 241,590.

*To all whom it may concern:*

Be it known that I, DOLPHAS D. PALMER, a citizen of the United States, and a resident of Waltham, in the county of Middlesex and State of Massachusetts, have invented an Improvement in Joints, of which the following description, in connection with the accompanying drawings, is a specification, like letters on the drawings representing like parts.

This invention relates to a universal joint of the ball-and-socket variety, and has for its object to provide a novel joint which is light in weight, extremely strong, and self-lubricating.

Figure 1:
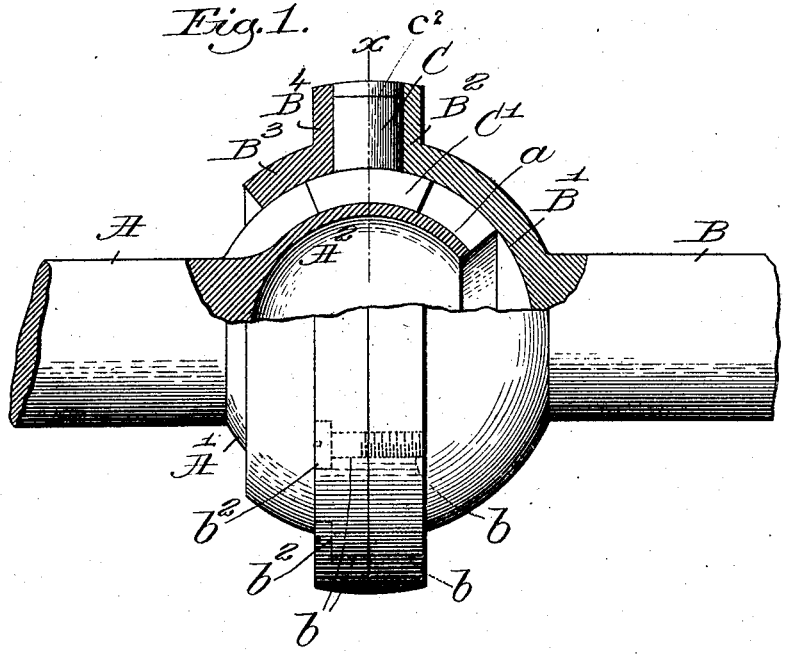
Figure 2:
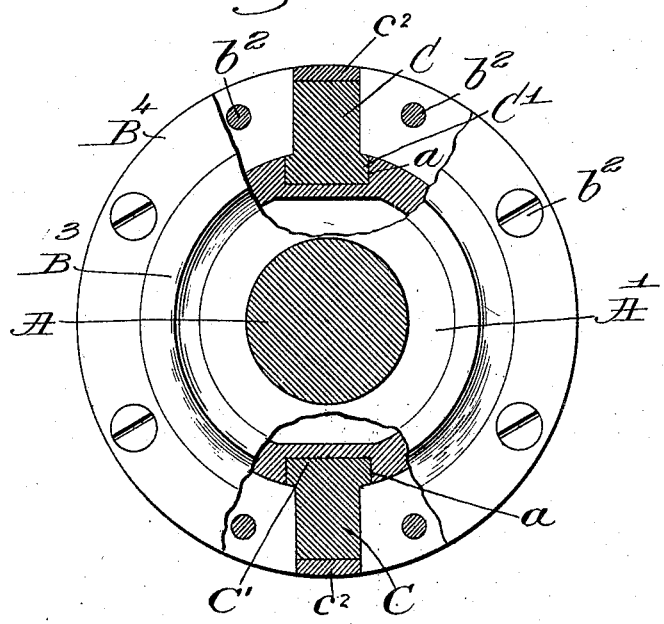

Figure 1 shows the ends of two shafts united by my novel joint. Fig. 2 is a left-hand end view, partially in section, in the line $x$.

A designates the shaft, having a ball $A'$ at one end, and B designates another shaft to be coupled to the shaft A and having the socket member $B'$ of the ball-and-socket joint. The ball member $A'$ is preferably made integral with the shaft and is hollow to form a lubricant-containing chamber $A^2$, said chamber being open at the end of the ball member. Said ball member is provided with grooves $a$, which extend in the direction of the shaft A, there being preferably two such grooves disposed on opposite sides of the ball member. Only one groove, however, is shown in the drawings. The socket member $B'$ is also preferably integral with the shaft B, and it is formed with the bearings $B^2$ to receive the gudgeons or trunnions C, said gudgeons or trunnions having heads $C'$ of a shape to fit the grooves $a$. The socket member is preferably made in two parts, one part being in the form of a ring, which is secured to the main member $B^3$ by clamping-screws $b^2$, which are threaded into the openings $b$ in a flange formed on the socket member and pass through holes $b'$ in said ring member. The purpose of making the socket member in two parts is to facilitate assembling the parts. The ball tightly fits the socket, and the heads $C'$ of the gudgeons (only one of which is shown) tightly fit the grooves $a$, so that any lubricant which may be placed in the chamber $A^2$ is retained therein. The making of the ball hollow not only furnishes a lubricant-containing chamber $A^2$, but also materially lightens the coupling or universal joint without reducing its strength.

It will be noticed that the open end of the lubricant-containing chamber is closed by the inner wall of the socket, and by placing suitable lubricant in this chamber when the parts are assembled a self-lubricating joint is provided.

$C^2$ designates closures of metal or fibroid or any suitable material which may be forced into the ends of the bearings $B^2$, thereby to protect the trunnions from dust or dirt.

Having fully described my invention, what I claim as new, and desire to secure by Letters Patent, is—

1. Two shafts to be coupled, one having a ball member at one end provided with external grooves, and the other having a socket member provided with gudgeons having heads to enter said grooves, the ball member being hollow and open at its end, whereby a closed lubricant-containing chamber is formed when the parts are assembled.

2. Two shafts to be coupled, one having integral therewith a ball member provided with external grooves and the other having integral therewith a socket member, and gudgeons carried by the socket member and having heads to enter the grooves, said ball member being hollow and open at one end, said end being closed by the socket member when the parts are assembled.

In testimony whereof I have signed my name to this specification in the presence of two subscribing witnesses.

DOLPHAS D. PALMER.

Witnesses:
GEO. W. GREGORY,
MARGARET A. DUNN.